June 25, 1957     P. B. HORTON     2,797,175
CERAMIC ELECTRICAL INSULATOR HAVING A SEMI-CONDUCTING GLAZE COATING
Filed May 26, 1955     3 Sheets-Sheet 1
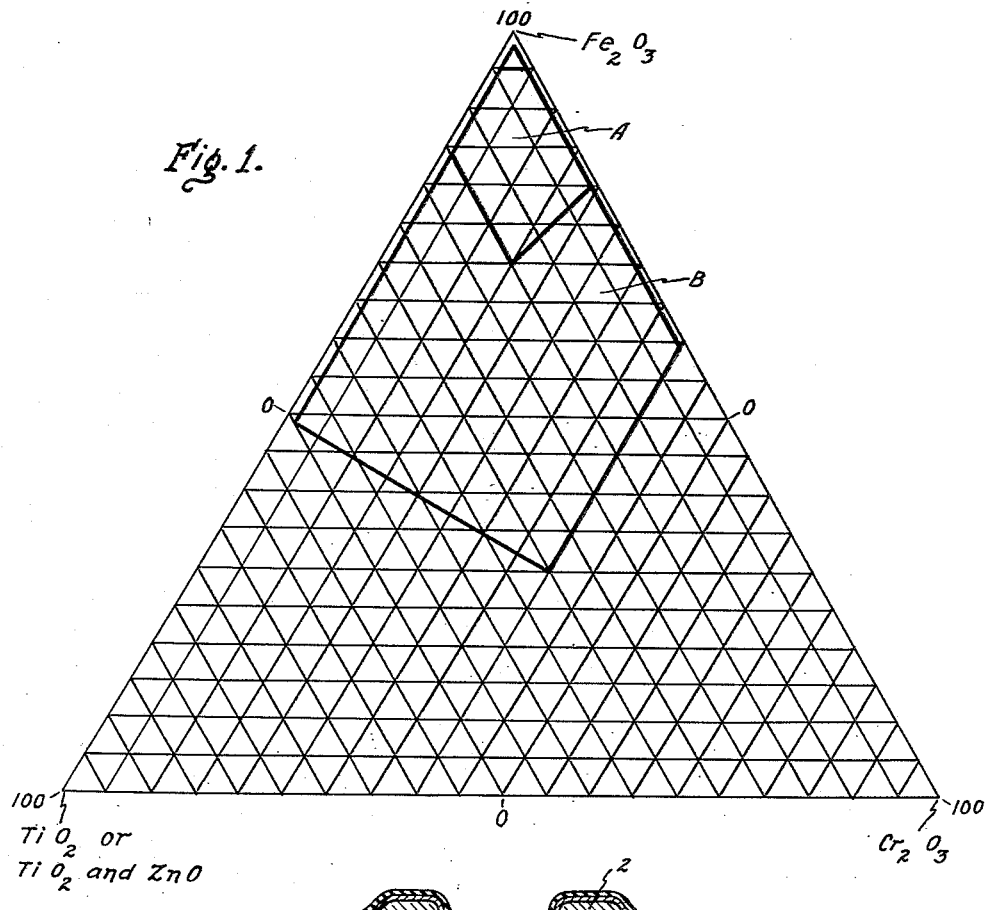
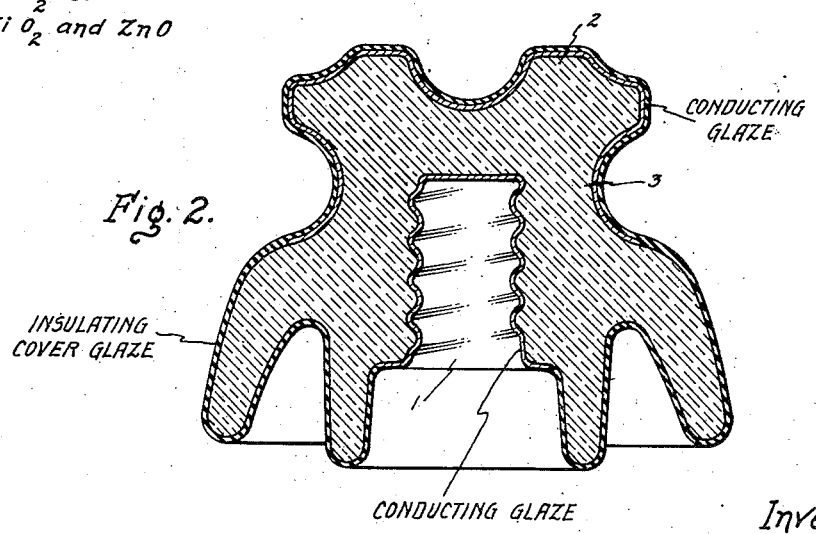
Inventor
Paul B. Horton,
by Gilbert P. Tarleton
His Attorney.

United States Patent Office 2,797,175
Patented June 25, 1957

2,797,175

CERAMIC ELECTRICAL INSULATOR HAVING A SEMI-CONDUCTING GLAZE COATING

Paul B. Horton, Baltimore, Md., assignor to General Electric Company, a corporation of New York Application May 26, 1955, Serial No. 511,316

4 Claims. (Cl. 117—221)

This invention relates to semi-conducting coatings, and more particularly, to semi-conducting glaze coatings useful for suppression of corona and voltage distribution or grading on high voltage ceramic electrical insulators.

One prior art form of semi-conducting coating consists essentially of ferric oxide ($Fe_2O_3$) and titanium dioxide ($TiO_2$). To impart a glossy surface to such semi-conducting coating glaze forming materials are added thereto.

Tests have indicated that in the manufacture and application of such prior art semi-conducting glaze coating it is difficult to obtain uniformly reproducible results. For instance, tests indicate that such prior art semi-conducting glaze coating is susceptible to variations in firing atmosphere, and perhaps to thickness of application. Additionally, experiments indicate that such glaze coating is apt to change in resistivity with changes in percent of glaze forming materials as well as when used with existing insulating cover glazes.

Accordingly, it is an object of this invention to provide a semi-conducting coating which will overcome the heretofore discussed disadvantages of prior art semi-conducting coatings.

It is a further object of this invention to provide a semi-conducting glaze coating whose characteristics can be uniformly reproduced.

It is a further object of this invention to provide a semi-conducting coating which is substantially not susceptible to variations in firing atmosphere and thickness of application.

It is a further object of this invention to provide a semi-conducting glaze coating that is compatible with existing insulating cover glazes and whose resistivity is substantially not susceptible to changes in percent of glaze forming materials.

My invention comprises a semi-conducting composition comprising ferric oxide ($Fe_2O_3$), chromic oxide ($Cr_2O_3$), and titanium dioxide ($TiO_2$). Zinc oxide ($ZnO$) can be added to said ingredients to act as a replacement for part of the titanium dioxide in the semi-conducting oxide composition or to act as a fluxing agent.

My invention further comprises a semi-conducting glaze coating comprising glaze forming materials, ferric oxide, chromic oxide, and titanium dioxide, or titanium dioxide and zinc oxide.

My invention will be better understood from the following description taken in connection with the accompanying drawings, and its scope will be pointed out in the appended claims.

Figure 3:
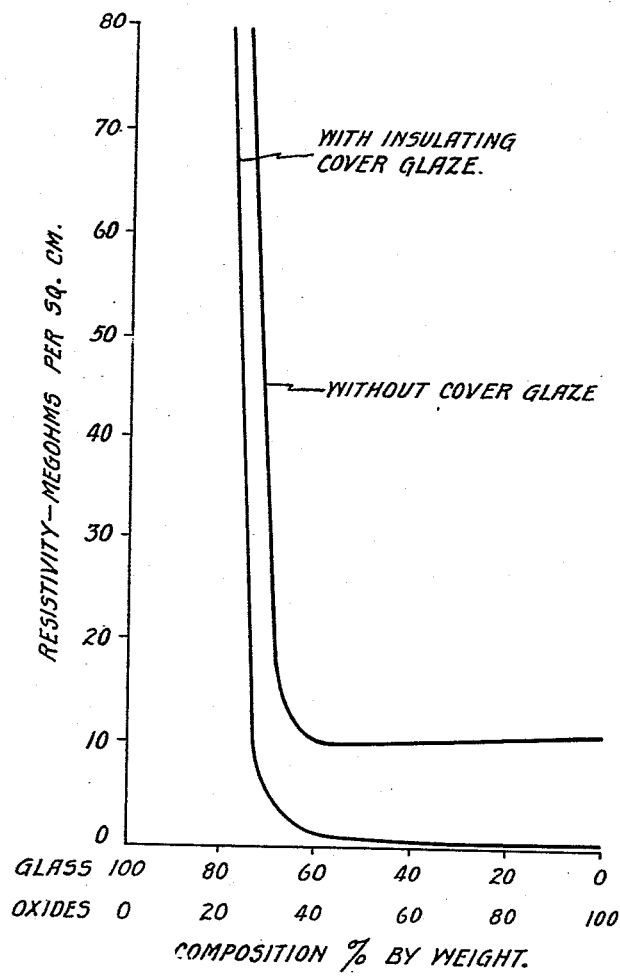
Figure 4:
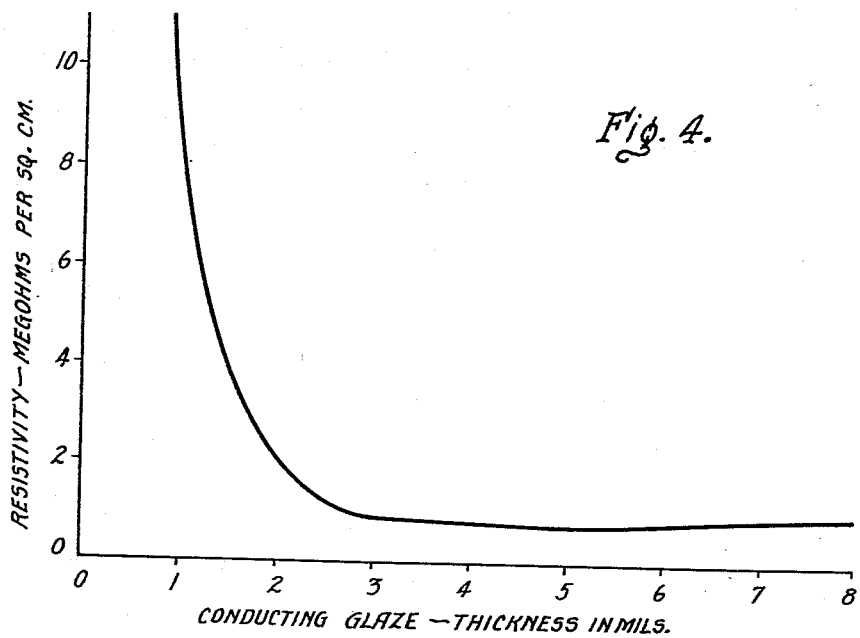
Figure 5:
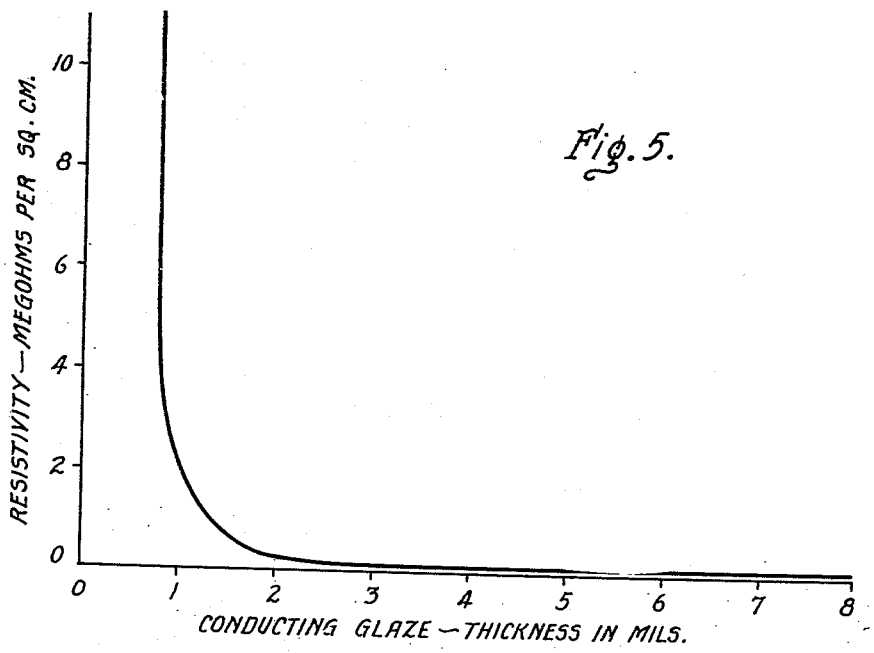

In the drawings, Fig. 1 is a triaxial diagrammatic illustration of the oxide composition of my semi-conducting coatings. Fig. 2 is a sectional elevation view of a pin type high voltage ceramic electrical insulator having my semi-conducting glaze and an insulating cover glaze applied thereto. Fig. 3 is a comparison of the resistivity of my semi-conducting glaze when used with or without an insulating cover glaze. Fig. 4 is a graphic illustration of the effect of glaze thickness on my semi-conducting glazes when used without an insulating cover glaze. Fig. 5 is a graphic illustration of the effect of glaze thickness on my semi-conducting glazes when used with an insulating cover glaze.

Referring now particularly to Fig. 1, as indicated by the area B outlined therein, in my invention the semi-conducting composition ingredients represented as percent of total oxide content comprises about 30 to 98% ferric oxide ($Fe_2O_3$), about 1.2 to 40% chromic oxide ($Cr_2O_3$), and about 0.8 to 50% titanium dioxide ($TiO_2$), or titanium dioxide and zinc oxide ($ZnO$). The chromic oxide content may be greater than the titanium dioxide content and some of the titanium dioxide may be displaced by zinc oxide to act as part of the semi-conducting oxide composition or as a fluxing agent. Such semi-conducting coatings can be used alone or mixed with glass or glaze forming materials to form a semi-conducting glossy coating. The just specified range of oxide ingredients are necessary and intentionally added ingredients as contrasted to impurities due to the glaze forming materials or otherwise. The addition of glaze forming materials increases the strength of the semi-conducting coatings and for compositions within the major area B which includes the minor area A, about 0 to 70% glaze forming materials can be used.

The conducting coating compositions within the major area B with or without glaze forming materials give good results. However, best results are obtained with those compositions within the minor triaxial area A when used alone or with about 30 to 70% glaze forming materials. The percent oxide composition within the minor area A is of the order of 70 to 95% ferric oxide, 1.2 to 19% chromic oxide, and 0.8 to 15% titanium dioxide, or titanium dioxide and zinc oxide.

In the insulator illustrated in Fig. 2 the pin hole 1, crown 2, and neck 3 thereof has a semi-conducting glaze coating applied thereto and all of the insulator exclusive of the pin hole 1 has an insulating cover glaze applied thereto. That is, the insulating cover glaze is also applied to the semi-conducting glaze coated crown 2 and neck 3 of the insulator. It will be appreciated that if the semi-conducting glaze is compatible with the insulating glaze no high degree of care need be exercised in applying the insulating glaze to the insulator since the insulating glaze can be applied over the semi-conducting glaze as contrasted to being careful of the overlap therebetween.

In Fig. 3 is illustrated the resistivity of one of my semi-conducting glazes with different percentages of glass or glaze forming material when used with or without an insulating cover glaze. For these curves the composition of the semi-conducting coating was:

| | Percent |
|---|---|
| Ferric oxide ($Fe_2O_3$) | 87.6 |
| Chromic oxide ($Cr_2O_3$) | 8.6 |
| Titanium dioxide ($TiO_2$) | 3.8 |
| | 100.0 |

The composition of the glass or glaze forming materials added to the above semi-conducting coating to give it a glossy surface was:

| | Percent |
|---|---|
| Feldspar | 28.6 |
| Ball clay | 22.2 |
| Flint | 23.8 |
| Whiting | 25.4 |
| | 100.0 |

It will be appreciated that the listed composition of the glass or glaze forming material is merely illustrative of several that can be used, and that other well known glaze forming materials such as the minerals ilmenite, bentonite and talc could be used.

The cover glaze composition was:

| | Percent |
|---|---|
| Feldspar | 18.5 |
| Clay | 22.6 |
| Flint | 34.2 |
| Whiting | 19.2 |
| Commercial glaze stain | 5.0 |
| Ferric oxide ($Fe_2O_3$) | 0.5 |
| | 100.0 |

The above recited composition for the cover glaze is not part of my invention but merely illustrative of existing insulating cover glazes with which my semi-conducting glazes are compatible.

Semi-conducting glazes having a resistivity of 40 or less megohms per square cm. are generally considered acceptable by industry standards. It will be noted from the two curves of Fig. 3 that with or without cover glazes my semi-conducting glazes have a resistivity of less than 40 megohms per square cm. inasmuch as my semi-conducting glazes utilize about 70% or less of glaze forming materials. Additionally, it will be noted from these two curves that in my semi-conducting glaze coatings, with or without cover glazes, a resistivity of 40 megohms per square cm. is attained even though the percent of glaze forming materials in the semi-conducting coating is varied over the wide range of 0 to 70%.

Experiments have also indicated that in my semi-conducting glaze compositions the resistivity is also substantially unaffected by the thickness of application of the semi-conducting glaze. This is illustrated in the graph of Fig. 4 where no cover glazes were used. The desirable thickness range for good appearance and good performance on porcelain insulators for high voltage circuits is of the order of 1.5 mils or more. As shown in Fig. 4, at or above a semi-conducting glaze thickness of 3 mils the resistivity is practically unaffected by variations in thickness of semi-conducting glaze application. In the graph of Fig. 5 a cover glaze of the composition heretofore specified was used and still the desired resistivity was substantially unaffected by variations in semi-conducting glaze thickness above about 2 mils. In the graphs of Figs. 4 and 5 the semi-conducting glaze composition was as follows.

| | Percent |
|---|---|
| Feldspar | 14.3 |
| Ball clay | 11.0 |
| Flint | 11.9 |
| Whiting | 12.7 |
| Chromic oxide ($Cr_2O_3$) | 3.2 |
| Ferric oxide ($Fe_2O_3$) | 43.8 |
| Titanium dioxide ($TiO_2$) | 3.1 |
| | 100.0 |

In the preparation of the oxide semi-conducting coatings the necessary oxide mix is prepared in accordance with the ranges outlined on the triaxial diagram of Fig. 1 and then water is added thereto to form an oxide semi-conducting slip. This slip can be applied to the desired portions of the insulator by spraying or painting, or the insulator can be dipped into the slip. The oxide semi-conducting coating can be used with or without glaze forming materials. Glaze forming materials will increase the strength of the semi-conducting coating and give it a glassy self-cleaning appearance. If increased strength and glassy appearance are desired the glaze forming materials are added to the oxide semi-conducting slip. As will be obvious to those skilled in the art, the oxide ingredients as well as the glaze forming materials when mixed are in a finely ground state, and then the insulator with its semi-conducting coating is fired in a kiln at about 2300° F. If an insulating cover glaze is to be added it can be applied to the insulator and semi-conducting glaze prior to firing. However, this can be done after firing, as when it is desired to cover bare spots or conducting glaze defects, and then the piece can be refired after application of the insulating cover glaze inasmuch as experiments indicate that my semi-conducting glazes are substantially unaffected by refiring or lack of special control of kiln atmosphere.

Additionally, tests conducted on my semi-conducting glaze coatings have indicated good acid corrosion resistance. Resistivity measurements on my semi-conducting coatings after acid treatment have shown no appreciable variation in resistivity.

While there have been shown and described particular embodiments of the invention, it will be obvious to those skilled in the art that changes and modifications may be made without departing from the scope of the invention, and therefore it is intended by the appended claims to cover all such changes and modifications as fall within the true spirit and scope of the invention.

What I claim as new and desire to secure by Letters Patent of the United States is:

1. A ceramic electrical insulator body having a semi-conducting glaze coating thereon, said coating consisting essentially of a mixture of ferric oxide, titanium dioxide, chromic oxide, and not more than about 70% by weight of glass forming materials, a substantial portion of said chromic oxide being present in said mixture as an intentionally added ingredient and other than an impurity, said coating having a thickness of not less than about 3 mils, and the total weight of said ferric oxide, titanium dioxide, and chromic oxide comprising about 30 to 98% ferric oxide, about 0.8 to 50% titanium dioxide, and about 1.2 to 40% chromic oxide.

2. A ceramic electrical insulation body having a semi-conducting glaze coating thereon, said coating consisting essentially of a mixture of ferric oxide, titanium dioxide, chromic oxide, and about 30 to 70% by weight of glass forming materials, a substantial portion of said chromic oxide being present in said mixture as an intentionally added ingredient and other than as an impurity, said coating having a thickness of not less than about 3 mils, and the total weight of said ferric oxide, titanium dioxide, and chromic oxide comprising about 70 to 95% ferric oxide, about 0.8 to 15% titanium dioxide, and about 1.2 to 19% chromic oxide.

3. A ceramic electrical insulator body having a semi-conducting glaze coating thereon, said coating consisting essentially of a mixture of ferric oxide, titanium dioxide, zinc oxide, chromic oxide, and not more than about 70% by weight of glass forming materials, a substantial portion of said chromic oxide being present in said mixture as an intentionally added ingredient and other than as an impurity, said coating having a thickness of not less than about 3 mils, and the total weight of said ferric oxide, titanium dioxide, zinc oxide and chromic oxide comprising about 30 to 98% ferric oxide, about 0.8 to 50% titanium dioxide and zinc oxide, and about 1.2 to 40% chromic oxide.

4. A ceramic electrical insulator body having a semi-conducting glaze coating thereon, said coating consisting essentially of a mixture of ferric oxide, titanium dioxide, zinc oxide, chromic oxide, and about 30 to 70% by weight of glass forming materials, a substantial portion of said chromic oxide being present in said mixture as an intentionally added ingredient and other than as an impurity, said coating having a thickness of not less than about 3 mils, and the total weight of said ferric oxide, titanium dioxide, zinc oxide, and chromic oxide comprising about 70 to 95% ferric oxide, about 0.8 to 15% titanium dioxide and zinc oxide, and about 1.2 to 19% chromic oxide.

References Cited in the file of this patent

UNITED STATES PATENTS

| 1,075,484 | Little | Oct. 14, 1913 |
| 2,590,893 | Sanborn | Apr. 1, 1952 |
| 2,590,894 | Sanborn | Apr. 1, 1952 |